United States Patent
Tombini

(10) Patent No.: US 6,608,490 B1
(45) Date of Patent: Aug. 19, 2003

(54) PACKAGING WITH CONTINUOUS LEAKTIGHT CHECK

(75) Inventor: Christian Tombini, Cestas (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/890,948

(22) PCT Filed: Feb. 14, 2000

(86) PCT No.: PCT/FR00/00356

§ 371 (c)(1),
(2), (4) Date: Aug. 8, 2001

(87) PCT Pub. No.: WO00/47972

PCT Pub. Date: Aug. 17, 2000

(30) Foreign Application Priority Data

Feb. 15, 1999 (FR) .......................................... 99 01782

(51) Int. Cl.$^7$ .............................................. G01R 27/00
(52) U.S. Cl. ..................... 324/692; 324/557; 73/49.3; 340/545.6; 340/605
(58) Field of Search ................................. 73/40.7, 49.2, 73/49.3; 324/450, 444, 439, 557, 558, 445, 693, 692; 340/545.6, 605

(56) References Cited

U.S. PATENT DOCUMENTS

| | | | |
|---|---|---|---|
| 3,324,729 A | * 6/1967 | Vanderslice | 417/48 |
| 4,135,384 A | 1/1979 | Burwell, Jr. et al. | 73/40.7 |
| 4,495,139 A | 1/1985 | Janberg et al. | 376/203 |
| 4,942,758 A | * 7/1990 | Cofield | 702/47 |
| 5,090,871 A | 2/1992 | Story et al. | 417/9 |
| 5,378,991 A | * 1/1995 | Anderson et al. | 324/450 |

* cited by examiner

*Primary Examiner*—Christine Oda
*Assistant Examiner*—Vincent Q Nguyen
(74) *Attorney, Agent, or Firm*—Thelen Reid & Priest LLP; Robert E. Krebs

(57) ABSTRACT

The invention is relative to a leaktight chamber (3) in which a liquid having electrical characteristics, preferably a conductive liquid, is introduced into a leaktight volume (33) between the cover (5) and the tank (4), and in that a value of electric quantities is measured which varies with the reduction of the liquid contained in the volume (33). In such a way the leaktightness is continually checked.

8 Claims, 2 Drawing Sheets

PACKAGING WITH CONTINUOUS LEAKTIGHT CHECK

CROSS-REFERENCES

The present application claims priority based on the foreign application filed in France Serial No. 99 01782 on Feb. 15, 1999.

FIELD OF THE INVENTION

The aim of the invention is a packaging, a container or a containment system where the leakage rate must, if possible, be nil or remain very low. The invention is particularly applicable to transport or storage containers for radioactive products or toxic chemical products.

TECHNOLOGICAL BACKGROUND

A storage or transport container for hazardous substances is shown in FIG. 1. This container comprises, in a known manner, an envelope 1 in steel for example. This envelope contains a mechanical and thermal protection 2 inside which is housed the containment in the chamber 3. This chamber is manufactured in a material suitable for containing the hazardous material to be stored. The containment is constituted by a tank 4 and a cover 5. In the same manner, the envelope 1 and the mechanical and thermal 2 part comprises a section protecting the tank 4 and a section protecting the cover 5. The cover 5 of the containment is generally constituted by a plug in which the seals are maintained. One of the gasket surfaces is integrated in the tank 4, the other is provided by the cover 5. The gasket surfaces are usually metal, for example in steel. In numerous containment systems, leaktightness is provided by two elastomer seals. The inter-seal volume, i.e. the volume contained between the two seals the cover 5 and tank 4 is used for measurement of the leakage rate. After filling the containment and its closure, the pressure can eventually be measured in the inter-seal space, by having for example previously emptied this volume and then filling with helium, and in this way check the leaktightness before definitive storage or the transport of the containment chamber. But subsequently, this pressure control device is not kept on the premises for reasons of pollution that the gas contained in the inter-seal space could cause in the event of leakage. On the other hand, leaktightness over a period of time is not guaranteed, as the seals can become porous, notably due to the air located in the inter-seal space or products contained in the chamber.

The invention involves a containment chamber which facilitates solving the two problems of the previous technology—permanent control of leaktightness in the containment system and secondly, ensuring less wear and tear on the seals.

BRIEF DESCRIPTION OF THE INVENTION

In order to continually measure the leakage rate of the leaktight chamber 3, a liquid is introduced in the inter-seal volume delimited by the cover, the tank and at least two seals. The liquid which occupies the inter-seal volume is part of the packaging leaktightness system by plugging possible small holes in the seals. Modification of a value of electrical quantities measured between the cover and the tank, which is variable depending on the quantity of liquid contained in the inter-seal volume, in this case facilitates determining a leakage value. When the cover 5 is put in place and tightened on the tank 4, the liquid is introduced by means of the first tap, for example. When the liquid has filled the inter-seal volume, the air bubbles and overflow of liquid is drained through the second tap. Closure of the two taps facilitates ensuring that the inter-seal volume is full of liquid. A leakage will be reflected by discharge of liquid and therefore by modification of the value of electrical quantities measured between the cover and the tank. In this way, taken in its most usual form, the invention is relative to a leaktight chamber comprising a tank having a cover surface to receive a cover, this cover surface itself comprising at least two gasket surfaces, leaktight seals inserted in the gasket surfaces of the tank, a cover having gasket surfaces, the leaktight seals being equally inserted in the said gasket surfaces of the cover, two seals, an inter-seal surface of the cover and an inter-seal surface of the tank, together delimiting an inter-seal volume, leaktight container characterized in that it comprises at least two means for connecting, reversibly, the inter-seal volume with an intake of fluid for one of the reversible means of connection with evacuation of fluid for the other means of reversible connection, and electrical coupling means to electrically connect the cover on the one hand and the tank on the other hand with outside measurement means.

In this way conveniently the invention provides continuous control of the leakage rate of the containment chamber.

In the preferred mode of execution, the means to place the inter-seal volume in communication in a reversible manner with an inlet and evacuation of fluid respectively are constituted by valves or taps.

The check on leaktightness is mainly provided by the interposition in the inter-seal space of a conductive liquid which facilitates electric continuity between the cover and the tank of the containment system. It is therefore sufficient, through appropriate means, to make a current circulate between the cover and the tank, and to measure continuously an electric quantity (amperage, resistance, etc.)—a shift in this quantity or a complete total variation (amperage becoming nil, resistance becoming infinite, etc.) will then be evidence of the disappearance of all or part of the liquid and therefore of leaktightness loss. In other words, a circuit is formed in which part is constituted by the conductive liquid in the inter-seal space which opens as soon as the liquid disappears from this volume. The type of this conductive liquid depends on the application. It should be pointed out that the inter-positioning of the liquid itself improves leaktightness, role of $3^{rd}$ seal and possibility of improving resistance over time of the two other seals. Preferably, measuring means for the electrical quantity are coupled to alarm triggering devices, themselves connected to a visual or sound alarm.

The invention also concerns a process of leak detection of a leaktight containment comprising a tank, a cover and two seals tightened between the tank and the cover, delimiting an inter-seal volume, process typified in that:

one fills the inter-seal volume with a liquid, conductor of electricity;

an electric current is circulated between the tank and the cover;

the resistance or value of the current is measured in order to deduce a loss of quantity of conductive liquid contained in the inter-seal volume.

BRIEF DESCRIPTION OF THE DRAWINGS

An example of realization of the invention will now be described with regard to the attached drawings in which.

DETAILED DESCRIPTION OF THE INVENTION

Figure 2:
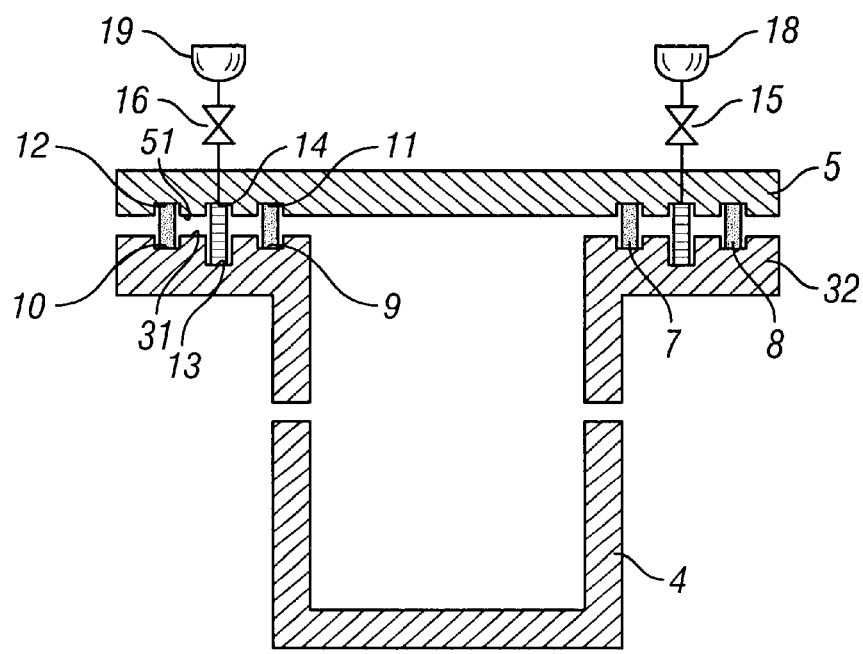
FIG. 2 is an axial skeleton cross-section of a containment system according to the invention designed to show the means of filling the inter-seal volume.

FIG. 2 is an axial cross-section of a tank 4 and a cover 5 according to the invention. This figure is above all designed to show the inter-seal volume on the one hand, and the filling and overflow valves on the other hand.

Figure 1:
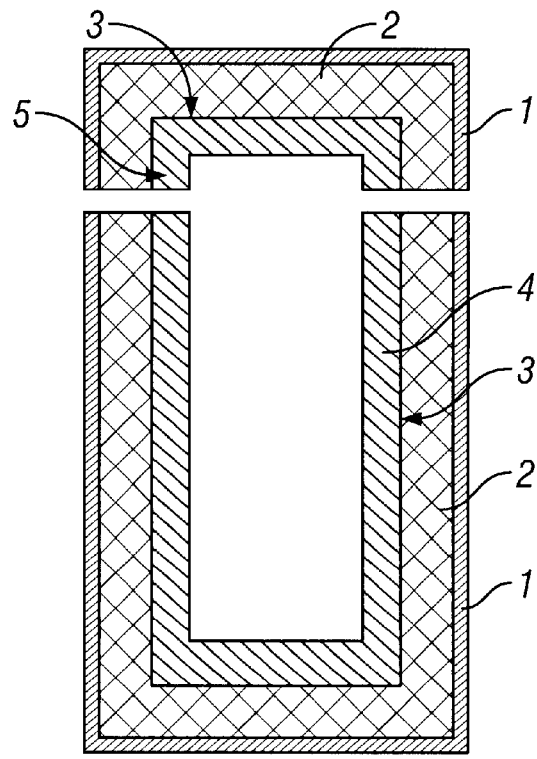
FIG. 1, already discussed, shows a schematic cross-section of a generic leaktight packaging.

The tank 4 has a cover surface 32. This cover surface comprises two seal-holder grooves, an interior groove 9 and an exterior groove 10. It also comprises a central recess groove 13 between grooves 9 and 10. The cover 5 comprises an interior groove 11 designed to receive a seal and an exterior groove 12. It consists also of a central groove 14 located between grooves 11 and 12. When the cover is in position, grooves 11 and 12 of the cover, and grooves 9 and 10 of the surface cover of the tank 4 are opposite each other and tighten the interior 7 and exterior 8 seals. The inter-seal grooves 13 of the tank 4 and central groove 14 of the cover 5 are opposite each other and are connected with the outside in a reversible manner by means of valves 15 and 16 respectively. The valve 15 can be the filling valve and valve 16 the overflow and purge valve. When the containment system comprising the tank 4 and the cover 5 is put into position in the container comprising the envelope 1 and the mechanical and thermal protection 2 (FIG. 1), valves 15 and 16 are embedded, although accessible, in the material constituting the envelope of mechanical and thermal protection 2. Valves 15, 16 connect an inter-seal volume 33 with a liquid inlet 18 and liquid drain 19 respectively.

On FIG. 2, these inlets 18 and drain 19 have been shown in the shape of funnels discharging into the valve ducts. Depending on the liquid introduced, this could well be leaktight joining elements or any other known means.

Figure 3:
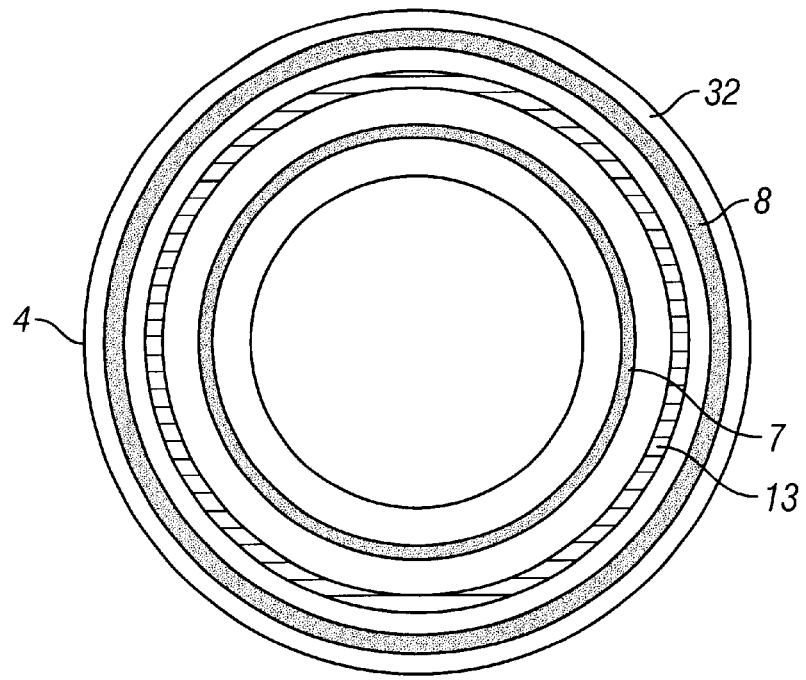
FIG. 3 shows an over view of the tank of the containment shown in FIG. 2.
Figure 4:
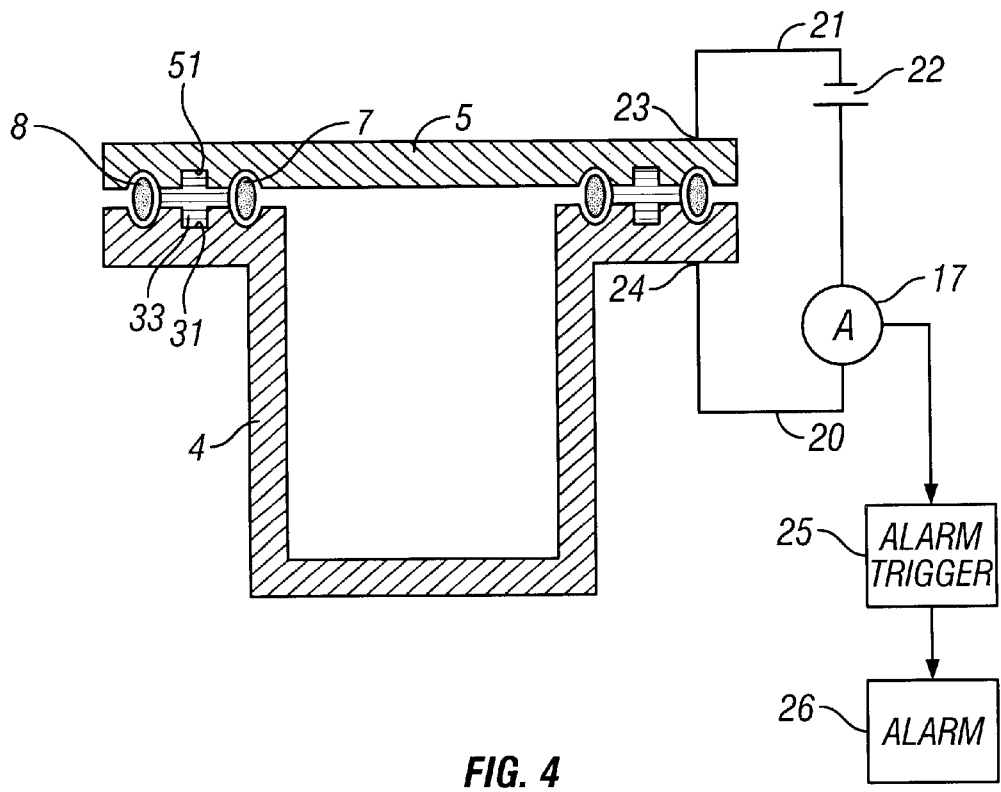
FIG. 4 shows a skeleton axial cross-section of a containment system according to the invention designed to show the measuring means of an electric quantity measured between the cover and the tank, of alarm triggering and alarm.

Conductors 20, 21 represented on FIG. 4 facilitate connecting the tank 4 and the cover 5 respectively to measuring means 17, and a source of electrical power 22. An electric quantity is measured between a section 23 of the cover 5 and a section 24 of the tank 4. Operation is as follows—when the cover is in a closed position as illustrated in FIG. 4 and tightened using bolts (not shown) on the tank 4, an inter-seal volume 33 delimited by a channel 31 of the tank 4 between the two grooves 9 and 10 and a channel 51 of the cover 5 between the grooves 11 and 12 and lastly by the seals 7 and 8 is filled with a liquid through means of the valve 15. During filling, the valve 16 is open so that the air in the inter-seal volume 33 can escape through the valve 16. When the liquid overflows from the valve 16 and after a complete air bleeding, the two valves 15 and 16 are closed. For more precise measurement the volume 33 is preferably as shown on FIGS. 3 or 4, increased by addition of a groove 13 in the tank or 14 in the cover. In the preferred mode of execution, the means 17 and 22 are respectively an ammeter and a source of electric potential generating several milliamps which circulate between the cover and the tank, traversing the liquid which is preferably a conductive liquid. An opening will cause a leak of the inter-seal liquid and will modify resistance of the assembly which can even be a cut-off of the electric circuit. Preferably, the ammeter 17 is connected to alarm triggering means 25 which will set off an alarm when the value measured is below a certain threshold.

The conductive liquid can be a conductive metallic alloy of gallium, indium, and tin, this can also be a conductive liquid of the metallic type to maintain temperature such as mercury where the operating field can range from −380 C to +3500 C, low cost watery solutions such as salt solutions of sodium chloride or copper sulfate, solutions of organic nature such as a long chain of organic acids or phenols to ensure better contact between the seals. The liquid could also be a liquid with a strong dielectric constant and in this case a capacity between the cover and the tank will be measured.

What is claimed is:

1. A leaktight containment comprising:

a tank;

a cover;

said tank and said cover having each a channel facing each other in a closed position of the containment;

at least two gaskets inserted between said tank and said cover, said gaskets having at least an inner gasket and an outer gasket;

a part of said channels of said tank, said cover, and said inner and outer gaskets delimiting a chamber;

at least two reversible connecting means in communication with said chamber, said reversible connecting means having at least a fluid inlet and a fluid outlet; and outside measurement means electrically coupled to said cover and said tank.

2. The leaktight containment according to claim 1, wherein said fluid inlet and said fluid outlet comprise each a valve or a tap.

3. The leaktight containment according to claim 2, wherein the outside measurement means comprise a source of current and an ammeter.

4. The leaktight containment according to claim 1, wherein said outside measurement means comprise a source of current and an ammeter.

5. The leaktight containment according to claim 4, wherein said outside measurement means are connected to alarm triggering means.

6. The leaktight containment according to claim 1, further comprising an alarm triggering means for triggering an alarm, said alarm triggering means being connected to said outside measurement means.

7. A closed leaktight containment comprising:

a tank;

a cover;

said tank and said cover having each a channel facing each other;

at least two gaskets inserted between said tank and said cover, said gaskets having at least an inner gasket and an outer gasket;

a part of said channels of said tank, said cover, and said inner and outer gaskets delimiting a chamber, said chamber filled with an electrically conductive fluid;

at least two reversible connecting means in communication with said chamber, said reversible connecting means having at least a fluid inlet and a fluid outlet; and outside measurement means electrically coupled to said cover and said tank.

8. The closed leaktight containment according to claim 7, wherein said electrically conductive fluid is a metallic alloy of gallium, indium, tin, or mercury, or a watery conductive solution or an organic conductive liquid.

\* \* \* \* \*